US010431781B2

(12) United States Patent
Zanoni et al.

(10) Patent No.: US 10,431,781 B2
(45) Date of Patent: Oct. 1, 2019

(54) BATTERY LOADING MAGAZINE

(71) Applicant: GENERAL ELECTRIC COMPANY, Schenectady, NY (US)

(72) Inventors: Michael Stanley Zanoni, Glens Falls, NY (US); Robert Anthony Oravsky, Jr., Lake George, NY (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 15/396,735

(22) Filed: Jan. 2, 2017

(65) Prior Publication Data
US 2018/0186580 A1    Jul. 5, 2018

(51) Int. Cl.
*H01M 2/10* (2006.01)
*B65G 59/02* (2006.01)
*B65D 85/68* (2006.01)

(52) U.S. Cl.
CPC .......... *H01M 2/1005* (2013.01); *B65D 85/68* (2013.01); *B65G 59/02* (2013.01); *H01M 2/1077* (2013.01); *B65D 2585/88* (2013.01)

(58) Field of Classification Search
CPC ............ B65D 21/0216; B65D 21/0201; B65D 21/0202; B65D 21/0204; B65D 21/0212;
(Continued)

(56) References Cited

U.S. PATENT DOCUMENTS 2,652,174 A * 9/1953 West ................ B65D 19/38
206/512
3,372,829 A * 3/1968 Averill .............. B65D 19/12
206/511
(Continued)

FOREIGN PATENT DOCUMENTS

DE        1005905 B  *  4/1957  ......... A47B 87/0292
DE   102014216407 A1 *  2/2016  ........... H01M 2/1077

OTHER PUBLICATIONS

Data Center Migration With the ServerLIFT SL-1000X, SL serverLIFT, Retrieved from the Internet URL: http://serverlift.com/solutions/products/sl1000x-server-lift/features, on Jun. 27, 2017, pp. 1-3.
(Continued)

*Primary Examiner* — Glenn F Myers
(74) *Attorney, Agent, or Firm* — Armstrong Teasdale LLP

(57) ABSTRACT

Systems and methods of handling batteries are provided. In particular, a method for loading battery assemblies within a storage rack using a battery magazine system can be provided. The method can include loading battery assemblies within a battery magazine. The battery magazine can include a first and second sidewall and a traverse wall extending between the first and second sidewalls. The battery magazine can be installed onto a base member using engagement features located on the battery magazine and a corresponding engagement feature located on the base member. Battery magazines can be stacked on top of each other to form battery magazine stacks to be loaded into a rack using a server lift. Each battery magazine can include a battery assembly configured to be received between the first and second sidewalls of the battery magazine. The battery assembly can further include at least one battery.

18 Claims, 12 Drawing Sheets

(58) Field of Classification Search
CPC ............ B65D 21/0222; B65D 21/0223; B65D 21/0209; B65D 21/0215; B65D 85/30; B65G 59/02; B65G 2814/031; H01M 2/1005; H01M 10/0404; H01M 2/1016; H01M 2/0245; H01M 2/1072; H01M 2/1077
See application file for complete search history.

(56) References Cited

U.S. PATENT DOCUMENTS

| | | | | |
|---|---|---|---|---|
| 3,374,915 A * | 3/1968 | Verhein | ................. | B65D 19/12 206/511 |
| 3,435,973 A * | 4/1969 | Dickey | .................... | B66F 9/18 414/607 |
| 4,907,695 A * | 3/1990 | Gomes | ................. | B65D 19/44 206/386 |
| 5,161,709 A * | 11/1992 | Oestreich, Jr. | ......... | B65D 19/12 220/1.5 |
| 5,191,985 A * | 3/1993 | Licari | ................ | A47B 87/0207 211/126.2 |
| 6,918,502 B1 * | 7/2005 | Overholt | .............. | A45C 7/0036 220/6 |
| 7,861,864 B2 * | 1/2011 | Hassell | .................... | B65D 1/34 206/386 |
| 8,985,328 B2 * | 3/2015 | Slaats | .................. | A47F 5/0018 206/386 |
| 9,919,838 B2 * | 3/2018 | Stahl | .................. | B65D 21/0212 |
| 2002/0015880 A1 * | 2/2002 | Heimer | ............... | H01M 2/1072 429/97 |
| 2007/0042263 A1 * | 2/2007 | Balash | ................ | H01M 2/1072 429/99 |
| 2013/0026057 A1 * | 1/2013 | Shapiro | ............. | B65D 21/0212 206/459.5 |

OTHER PUBLICATIONS

Steel Platform Ladder with Rubber-Covered Steps, McMaster-Carr, Retrieved from the Internet URL: https://www.mcmaster.com/#8103t66/=189hw1r, on Jun. 28, 2017, pp. 1-1.

* cited by examiner

BATTERY LOADING MAGAZINE

FIELD

The present subject matter relates generally to energy storage devices.

BACKGROUND

Energy storage products, such as batteries, can require loading batteries into racks that can be up to ten feet tall. The number of batteries that are installed could number into the 1000s. Loading the batteries by hand can present safety hazards through possible repetitive motion injury, risk of strain and injury due to impact of a falling battery. This can create ergonomic and safety concerns as the batteries can, in some instances, weigh from about 105 to about 115 lbs.

In contrast, using a mechanical loading system can reduce risk of injury and damage to the battery. A battery handling system can be used whereby the batteries to be loaded are be pre-arranged in a stack, placed on a lift and loaded into racks using a server lift. The batteries do not have to be lifted by hand, preventing injury and battery damage. As a result, mechanical loading of batteries can improve safety and reduce ergonomic injury.

BRIEF DESCRIPTION

Aspects and advantages of embodiments of the present disclosure will be set forth in part in the following description, or can be learned from the description, or can be learned through practice of the embodiments.

One example aspect of the present disclosure is directed to a battery handling system includes a base member including at least one support wall. The at least one support wall defines an upper surface. The system includes a battery magazine configured to engage the upper surface of the base member. When the battery magazine is installed onto the base member, the at least one base member is configured to prevent lateral movement of the battery magazine relative to the base member.

Another example aspect of the present disclosure is directed to a method for loading battery assemblies within a storage rack. The method includes stacking a plurality of battery magazines onto a base member to form a battery magazine stack, each battery magazine at least partially surrounding a battery assembly. The method includes lifting the base member and the battery magazine stack relative to the storage rack, the storage rack defining a plurality of storage slots, each storage slot configured to receive one of the battery assemblies. The method further includes vertically aligning a top battery magazine of the battery magazine stack with a corresponding storage slot of the plurality of storage slots. The method further includes laterally moving the battery assembly contained within the top battery magazine relative to an adjacent battery magazine of the battery stack to install the battery assembly into the corresponding storage slot.

Variations and modifications can be made to these example embodiments. These and other features, aspects and advantages of various embodiments will become better understood with references to the following description and appended claims. The accompanying drawings, which are incorporated in and constitute a part of this specification, illustrate embodiments of the present disclosure and together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
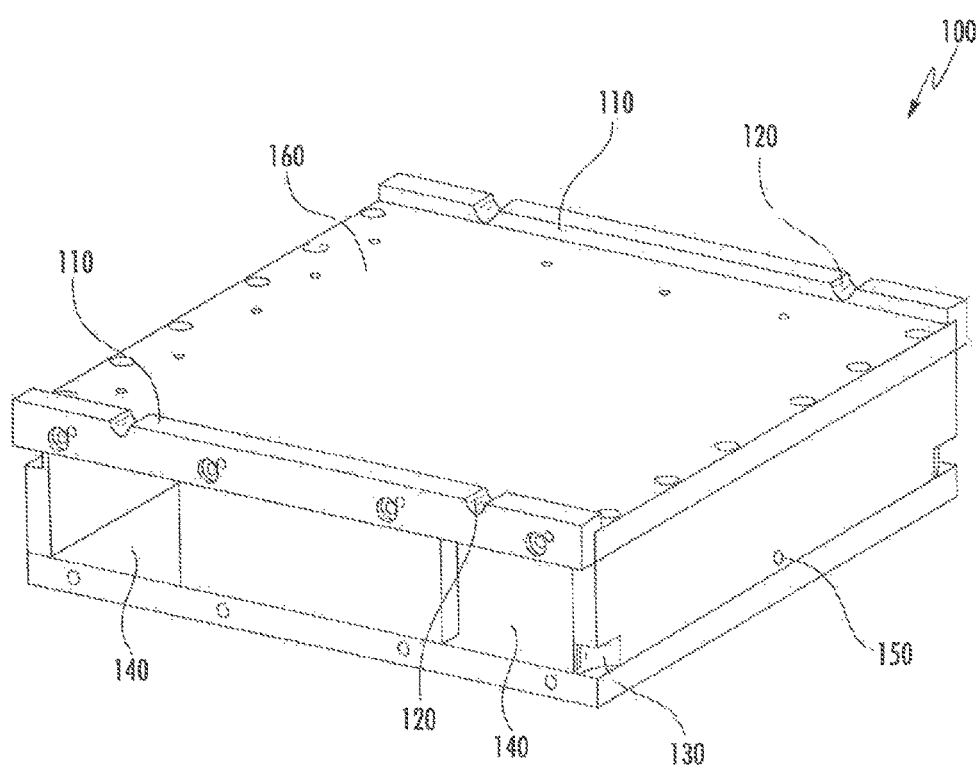
FIG. 1 depicts an example base member according to example embodiments of the present disclosure.

Reference now will be made in detail to embodiments of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to a battery handling system. Energy storage products, such as batteries, can require loading into racks that can be up to ten feet tall. Loading the batteries by hand can present safety hazards through possible repetitive motion injury, risk of strain and injury due to impact of a falling battery. This can create ergonomic and safety concerns as the batteries can, in some instances, weigh from about 105 to about 115 lbs. As used herein, the term "about," when used in reference to a numerical value is intended to refer to within 30% of the numerical value. According to example embodiments of the present disclosure, a battery handling system can be used whereby the batteries can be pre-arranged in a stack, placed on a lift and loaded into racks using a server lift. The batteries do not have to be lifted by hand, preventing injury and battery damage. As a result, the present disclosure can improve safety and reduce ergonomic injury.

Example aspects of the present disclosure are directed to a battery handling system. Energy storage products, such as batteries, can require loading into racks that can be up to, for instance, ten feet tall or higher. Loading the batteries by hand can present safety hazards through possible repetitive motion injury, risk of strain and injury due to impact of a falling battery. This can create ergonomic and safety concerns as the batteries can, in some instances, weigh from about 105 to about 115 lbs. As used herein, the term "about," when used in reference to a numerical value is intended to refer to within 30% of the numerical value. According to example embodiments of the present disclosure, a battery handling system can be used whereby the batteries can be pre-arranged in a stack, placed on a lift and loaded into racks using a server lift. The batteries do not have to be lifted by hand, preventing injury and battery damage. As a result, the present disclosure can improve safety and reduce ergonomic injury.

Example aspects of the present disclosure are directed to a battery handling system. When batteries are transported using a mechanical system such as a server lift, batteries can be damaged because the battery assembly may not be secured to the server lift during transport. According to example aspects of the present disclosure, each battery can be placed within a removable battery magazine that can be used with a base member to secure the battery to the server lift and allow it to be moved into a battery storage rack. In example embodiments, engagement features can be employed on the upper surface of the base member to engage a corresponding engagement feature of the battery magazine. For example, engagement features located on the base member and the battery magazine can lock the battery magazine to the base member and protect the batteries from damage due to possible dropping or jarring during movement. Example aspects of the present disclosure can include feed ramp and pin hole features on the base member to lock the base member to a server lift to prevent lateral movement of each battery magazine 200 relative to an adjacent battery magazine 200 during transport.

Without a mechanical support system, transporting batteries into a battery storage rack can be difficult, dangerous, and wasteful. When using mechanical support systems like server lifts, loading batteries using a server lift to lift one battery at a time can be inefficient and time consuming. Using a server lift can be time consuming because the lift must be adjusted after each load to match each battery with the proper slot in the storage rack. Example aspects of the present disclosure can include a battery loading system to lift multiple batteries for loading into a storage rack. A base member and a battery magazine can be used with a lift system to lift a stack of batteries and slide them into storage racks. Engagement features located on the base member and the battery magazine can be used to stack multiple batteries on top of each other. In this way, lateral movement of one battery magazine relative to an adjacent battery magazine during transportation and load can be reduced. Example embodiments of the present disclosure can make load process time faster by reducing time used for lift adjustment during load. For example, the battery magazine can be configured so that the battery magazine height and the height of each slot in the storage rack are substantially equal. In this way, once a first battery is loaded into the storage rack, the other batteries in the stack are already in proper position for load. In example embodiments, the engagement features on the battery magazine can be rounded for ease of assembly during the loading process.

Example aspects of the present disclosure can provide a number of technical effects and benefits. For example, risk of strain and injury to employees due impact of a falling battery can be reduced. Costs associated with injured employees and/or damaged batteries can be avoided. In addition, faster installation of batteries is possible which can reduce installation labor costs. As a result, batteries can be installed into taller racks holding more batteries that make for more batteries per sq. ft. with faster battery installation.

Referring now to the figures, example aspects of the present disclosure will be discussed in greater detail.

FIG. 1 depicts an example base member 100 according to example embodiments of the present disclosure. Base member 100 can be used to stack one or more battery magazines for transportation and loading. Base member 100 can include at least one support wall 160. Support wall 160 can be on an upper surface of base member 100. The upper surface of base member 100 can include one or more base engagement features 120. The one or more base engagement features 120 can be configured to engage the one or more magazine engagement features 220 located on the lower surface of a battery magazine 200. For example, the one or more base engagement features 120 can be a female portion configured to engage battery magazine 200 longitudinally. Base member 100 can include fork lift openings 140. The forklift openings 140 can be configured to allow a forklift to lift base member 100 for loading batteries into racks. Base member 100 can include feed ramp 130 and locking pin hole 150 configured to engage a fork lift or any other lifting machine. Feed ramp 130 and pin hole 150 can be located adjacent to forklift openings 140. In example embodiments, feed ramp 130 and locking pin hole 150 can be used to retain base member 100 to server lift roller guides 1110. For example, feed ramp 130 and pin hole 150 can be configured to lock automatically to a server lift, preventing movement during transport. Base member 100 can include guide rails 110. When battery magazine 200 is stacked on top of base member 100, guide rails 110 can prevent battery magazine 200 from movement in the lateral direction during installation.

Figure 2:
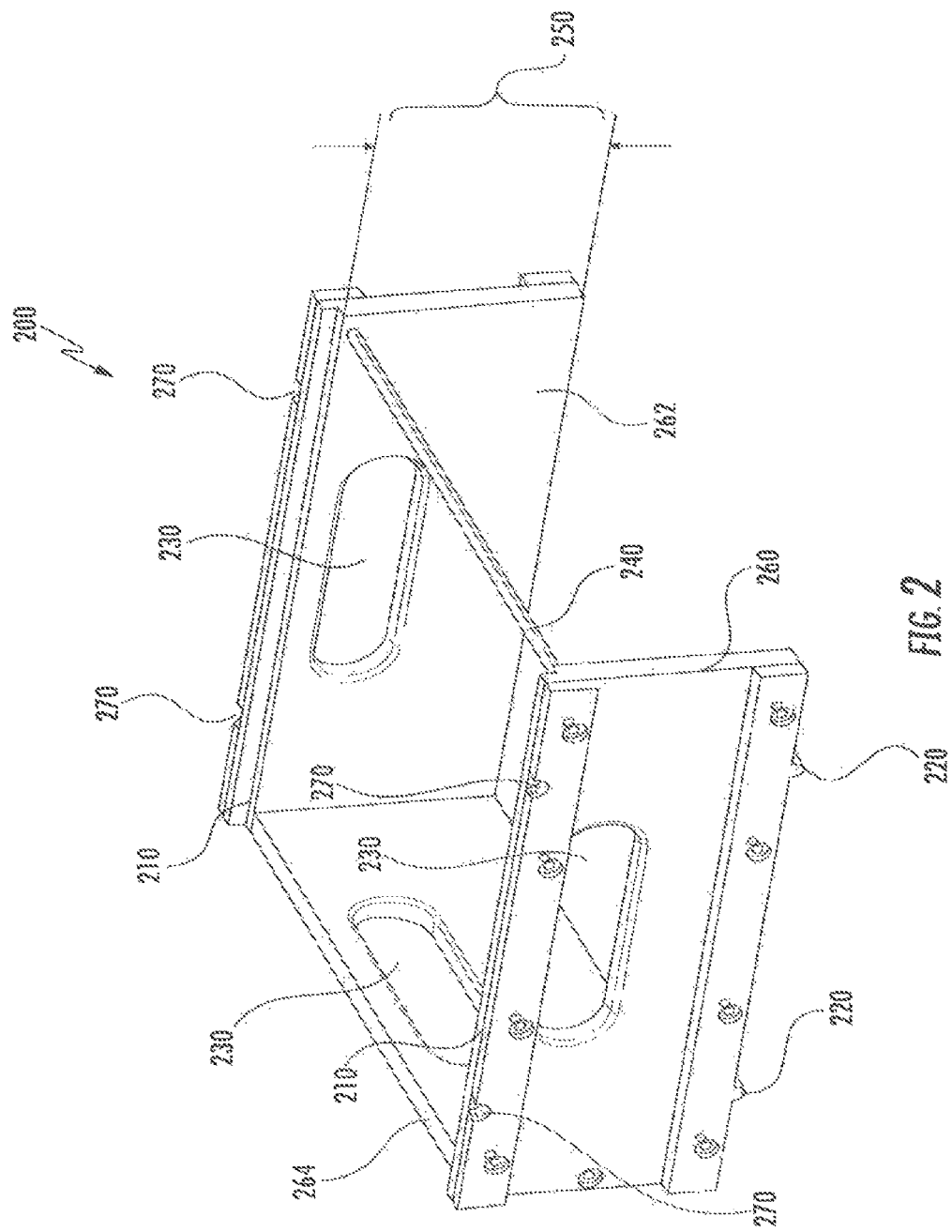
FIG. 2 depicts an example battery magazine according to example embodiments of the present disclosure.

FIG. 2 depicts a battery magazine 200 according to example embodiments of the present disclosure. Battery magazine 200 can include first side wall 260 and second side wall 262. Battery magazine 200 can include a traverse wall 264 extending between the first and second sidewalls. A crossbar member 240 can be included on an opposite side of traverse wall 264. Side walls 260,262 can each include an upper surface and a lower surface. The battery magazines can be configured to be stacked on top of each other using one or more engagement features. When the battery magazines are stacked on top of each other, the bottom battery magazine 200 can be configured to engage a base member 100. The lower surface of side walls 260,262 can include one or more magazine engagement features 220. In example embodiments, the one or more magazine engagement features 220 can have a male portion. The shape of the male portion can be ribs configured to lock into the one or more base engagement features 120 or second battery magazine engagement feature 270. Battery magazine 200 can include one or more second magazine engagement features 270. The one or more second engagement feature 270, can be located on an upper surface of the first sidewall 260 or second sidewall 262 of battery magazine 200. In example embodiments, the one or more second magazine engagement features 270 can have openings configured to engage a corresponding engagement feature 220 of an adjacent battery magazine 200 when the batteries are stacked on top of each other. For example, the one or more second magazine engagement features 270 can be a female portion with openings. The second magazine engagement features 270 can be configured to lock the battery magazine 200 vertically relative to an adjacent battery magazine. The height 250 of battery magazine 200 can be substantially equal to rack spacing/slot, making the load process faster and avoiding lift adjustment.

Figure 8:
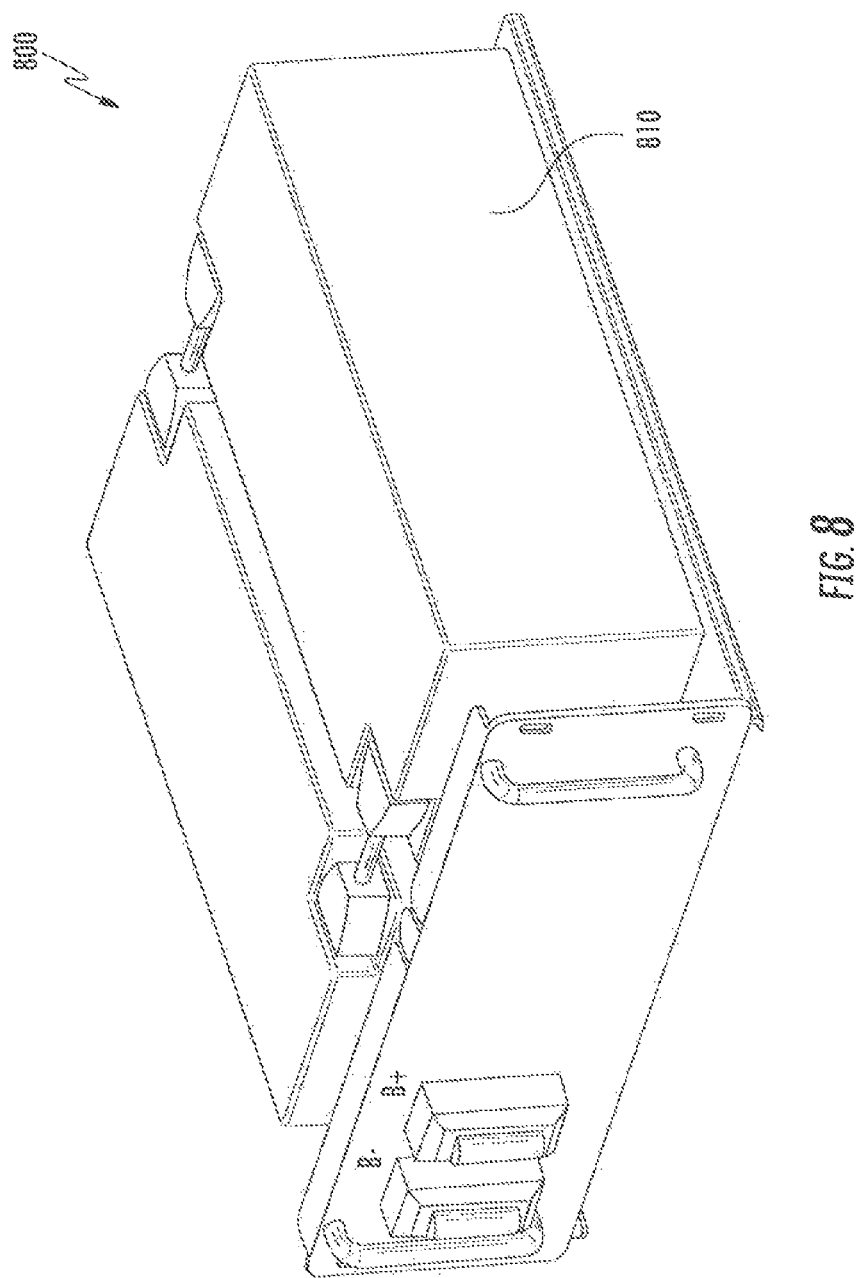
FIG. 8 depicts an example battery assembly according to example embodiments of the present disclosure.

Battery magazine 200 can include a crossbar member 240. Crossbar member 240 can be located on the opposite side of traverse wall 264 between side walls 260 and 262. Crossbar member 240 can be configured to engage a portion of the battery assembly 800 to prevent lateral movement of the battery assembly 800 (as shown in FIG. 8) relative to the battery magazine 200 in a direction opposite the traverse wall 264. Crossbar member 240 can be made from nonconductive material to prevent electrical short with battery terminals. Battery magazine 200 can include guide rails 210. Guide rails 210 can help prevent movement of battery 810 during installation. Battery magazine 200 can include elongated openings 230 located on side walls 260,262 and traverse wall 264. The elongated openings 230 can be used as handles to improve handling of the battery magazine 200. The elongated openings 230 can be located on the upper surface of each side walls 260 and 262 and traverse wall 264. The elongated openings 230 can help reduce weight of battery magazine 200.

In example embodiments, one or more battery magazines 200 can be stacked on top of each other to form a battery stack 700. This can make the loading process more efficient because more batteries can be racked in less time. When batteries are stacked on top of each other the weight of the battery assemblies 800 contained in each battery magazine is transferred onto the battery magazines preventing possible damage to the batteries. The stack of batteries 700 can be loaded on a server lift and loaded into the proper slot in the rack. According to example embodiments, the height of each battery magazine 250 can be configured to be substantially equal to the height of the loading slot 910 in the rack. This can help reduce loading time because once one battery is loaded; each battery is already in the proper position for load.

Battery magazine 200 can be made from a material that is strong and durable and has a low coefficient of friction. Battery magazine 200 can be made from a material that can allow a single person to safely push the battery magazine 200 into location. Any material with a required pushing force lower than a threshold consistent with safe single person operation can be selected. For example, battery magazine 200 can be made from Nylon 6. Alternatively, any other suitable material that can reduce safety hazards can be selected.

Figure 3:
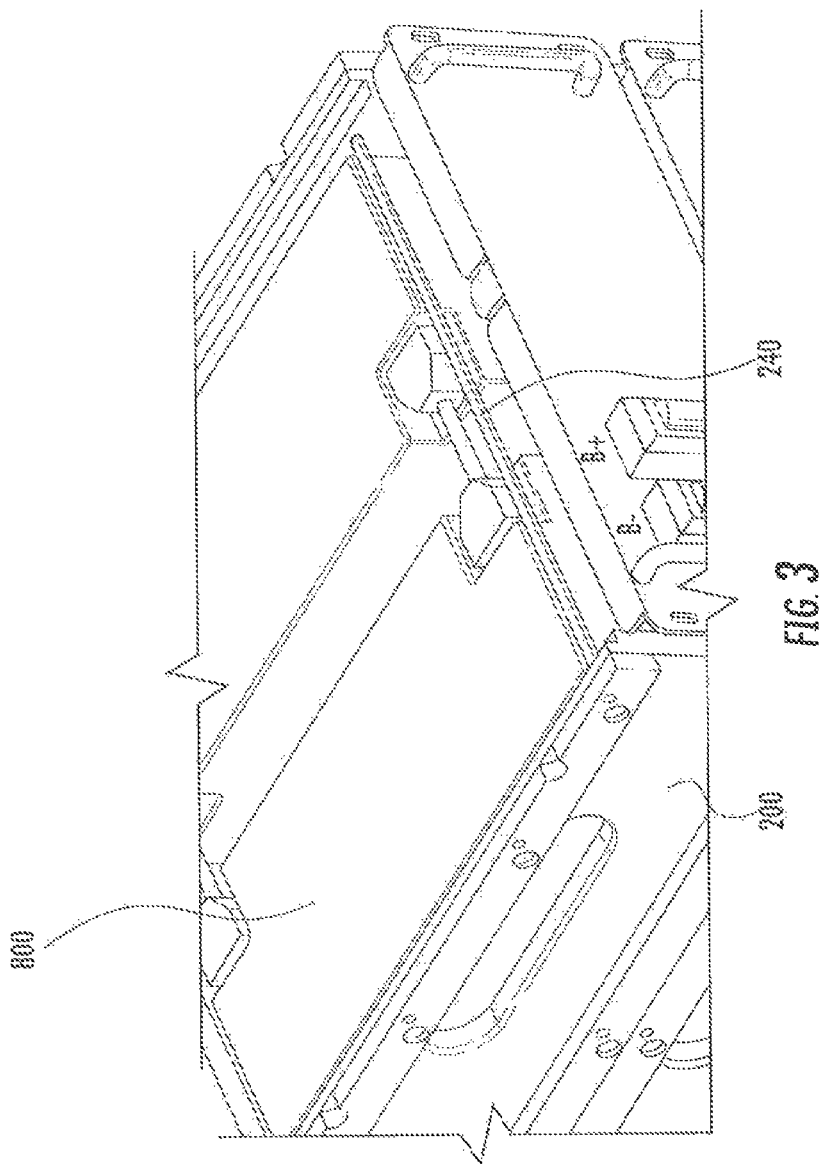
FIG. 3 depicts an example crossbar member according to example embodiments of the present disclosure.

FIG. 3 depicts a close up view of crossbar member 240 with a battery assembly 800 secured in the battery magazine 200 according to example embodiments of the present disclosure. Crossbar member 240 can be used to prevent movement of battery assembly 800 during transportation and load. Crossbar member 240 can be non-conductive material to prevent electric short with battery terminals. Crossbar member 240 can be used to add strength and structure to the battery magazine 200.

Figure 4:
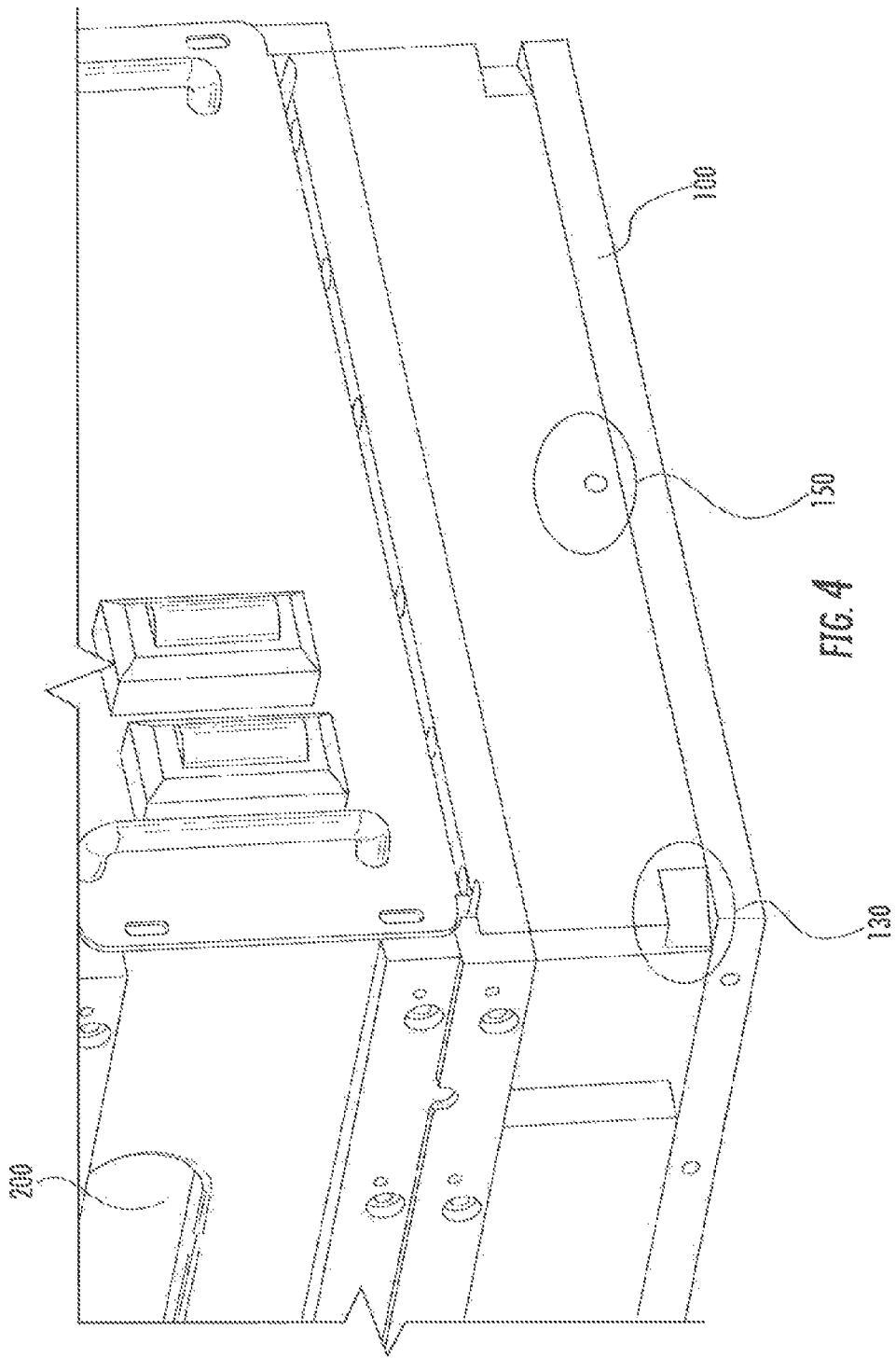
FIG. 4 depicts an example feed ramp and locking pin hole according to example embodiments of the present disclosure.

FIG. 4 depicts a perspective view of base member 100 with feed ramp 130 and pin hole 150. Feed ramp 130 and pin hole 150 can be configured to engage a locking pin in a server lift. In example embodiments, feed ramp 130 and locking pin hole 150 can be used to retain base member 100 to server lift roller guides 1110. For example, feed ramp 130 and pin hole 150 can be configured to lock automatically to a server lift, preventing movement during transport.

Figure 5:
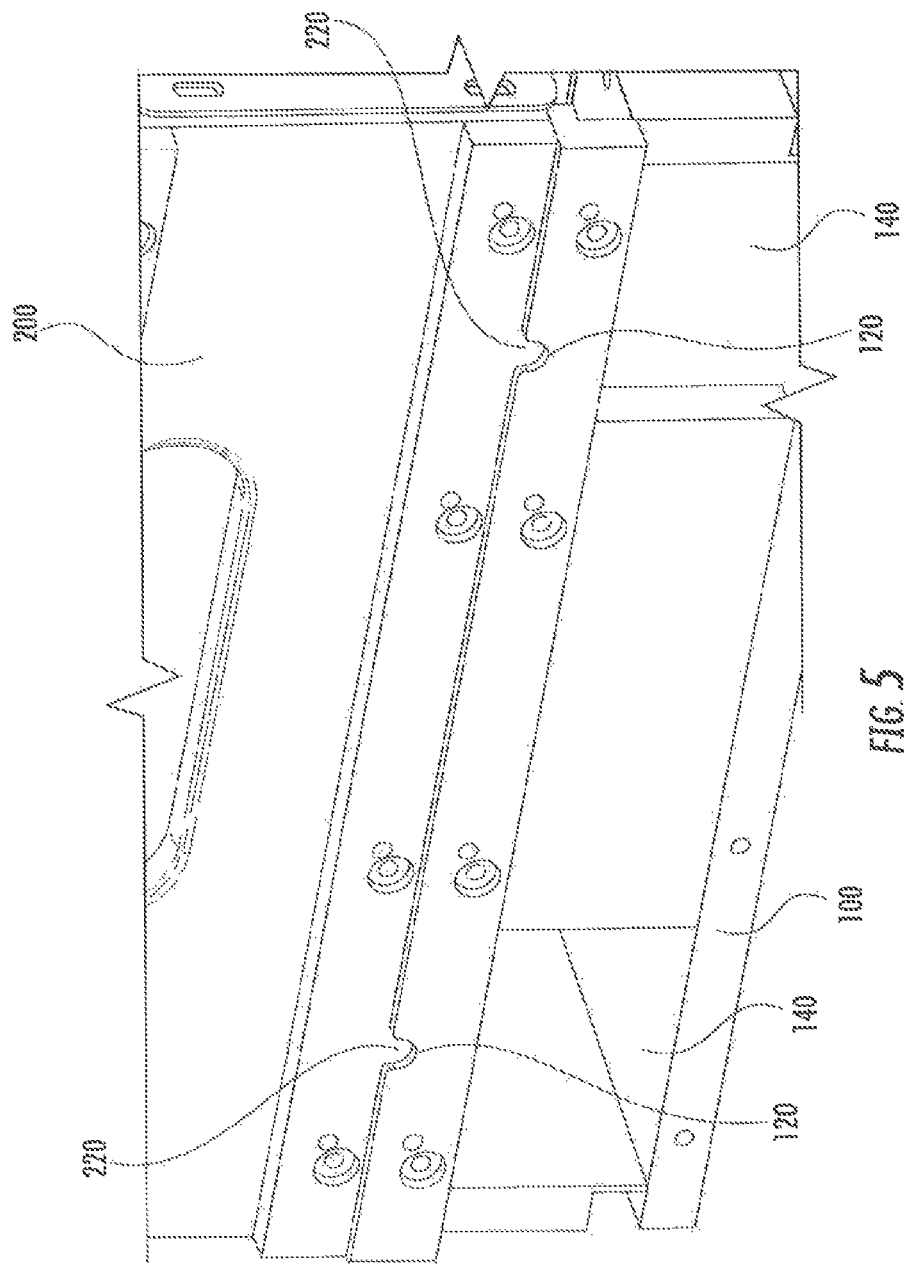
FIG. 5 depicts example engagement features according to example embodiments of the present disclosure.

FIG. 5 depicts battery magazine 200 stacked on top of base member 100. Battery magazine 200 can be stacked on top of base member 100 to prevent movement during transport. The upper surface of the base member 100 can include one or more base engagement features 120. The one or more base engagement features can form a female portion configured to engage a male portion of the one or more battery magazine engagement feature 220 or vice versa.

Figure 6:
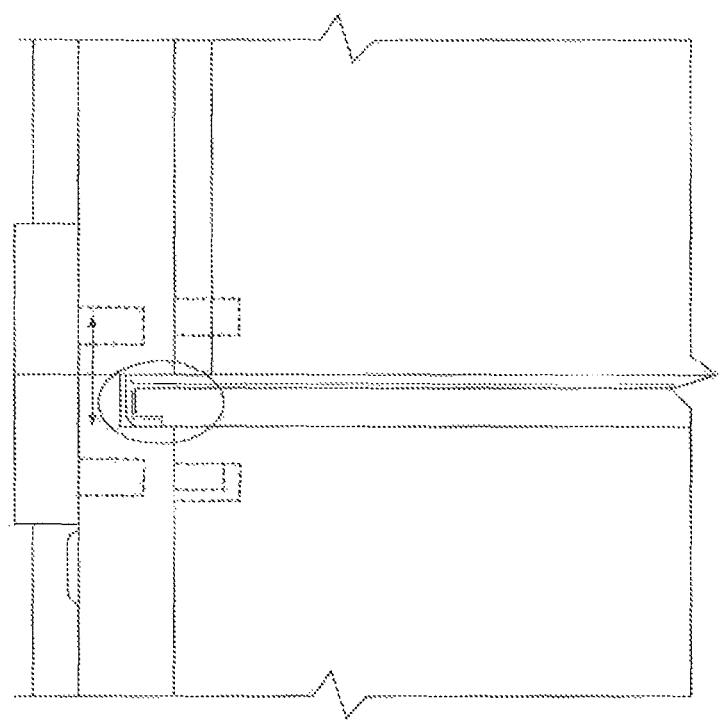
FIG. 6 depicts an example lateral locking feature according to example embodiments of the present disclosure.

FIG. 6 depicts perspective view of two battery magazines stacked on top of each other as shown in FIG. 5. When two battery magazines are stacked on top of each other, the engagement features located on the lower surface 220 of the upper magazine and the second engagement features located on the upper surface 270 of the bottom magazine can lock the battery magazines 200 from moving laterally. In this manner, lateral locking of the battery magazines can shift the weight of the batteries onto the magazines to protect the batteries. As a result, the nesting and stacking of multiple batteries is possible.

Figure 7:
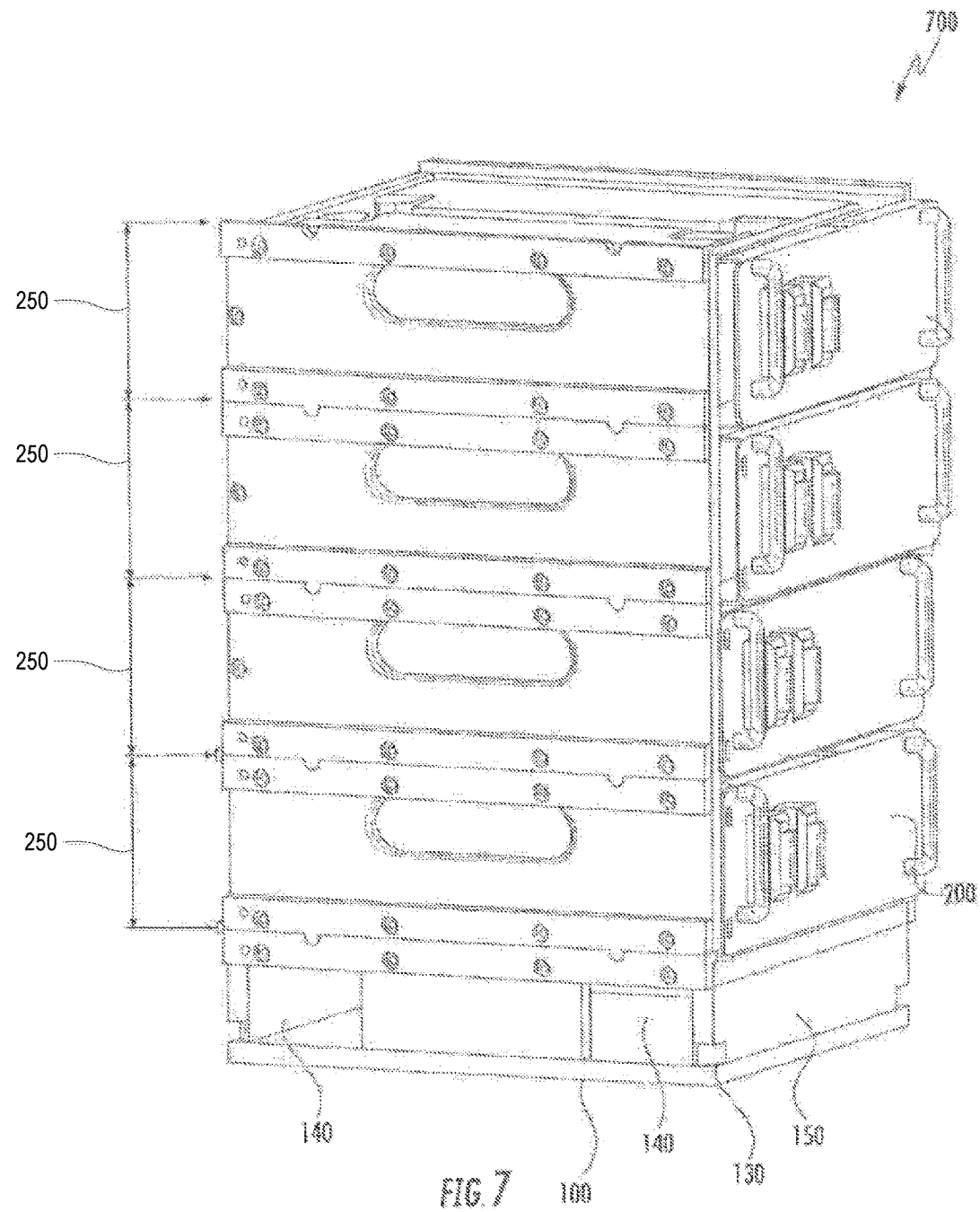
FIG. 7 depicts an example magazine height according to example embodiments of the present disclosure.

FIG. 7 shows a stack of batteries 700 according to example embodiments of the present disclosure. The height of each battery magazine 250 located in the battery stack 700 can be configured to be substantially equal to the rack shelf/slot height. Battery assemblies 800 can be loaded into battery magazine 200. Each battery magazine 200 can include one or more engagement features located on the upper surface 270 and lower surface 220 of the battery magazine. When two battery magazines are stacked on top of each other, the engagement features located on the lower surface 220 of the top magazine and the second engagement features located on the upper surface 270 of the bottom magazine can lock the battery magazines 200 laterally. The one or more magazine engagement features 220 located on the lower surface of battery magazine 200 can be configured to engage a second engagement feature 270 located on the upper surface of an adjacent battery magazine. For example, the one or more magazine engagement features 220 located on the lower surface of battery magazine 200 can be a male portion with a plurality of ribs extending outwardly from the lower surface. The one or more second engagement features 270 located on the upper surface of an adjacent battery magazine can be a female portion with openings configured to receive the ribs. The magazine engagement features located on the upper surface 270 and lower surface 220 of battery magazine 200 can lock the battery magazines preventing lateral movement. The use of the battery magazine system 200 can allow the magazine system to retain the batteries 810 in a safe and secure way for transportation from the pallet they are delivered in to the rack 920 for installation. As a result, dropped and damaged batteries can be prevented.

Figure 9:
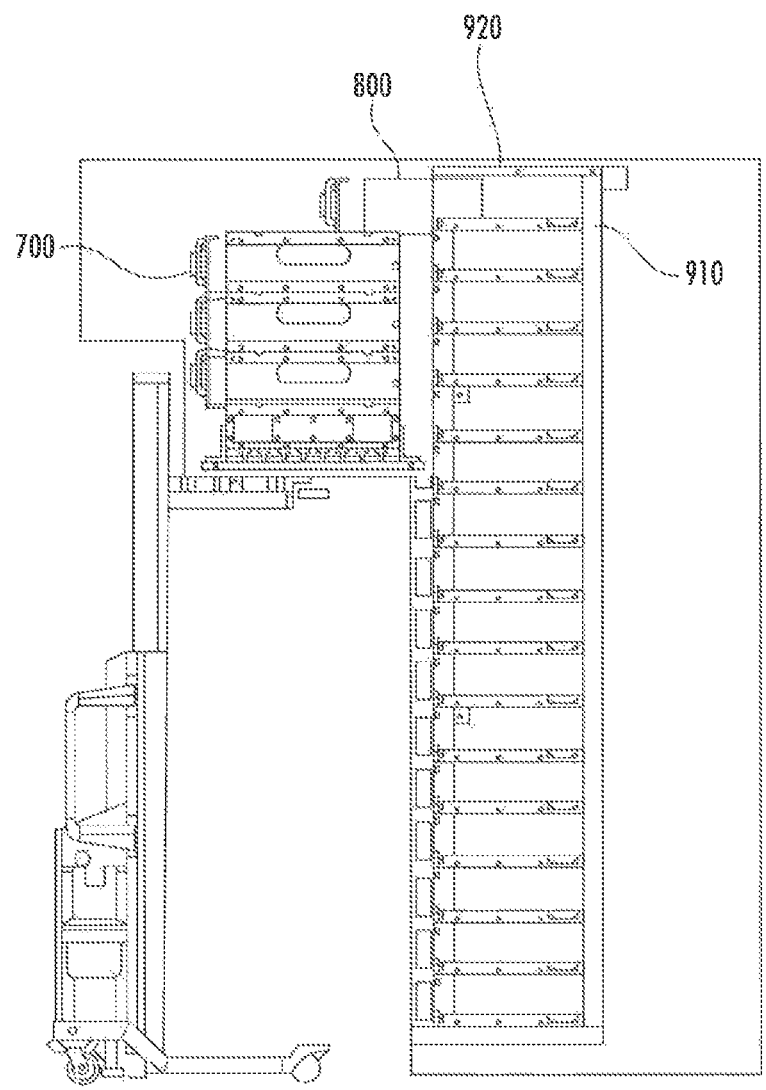
FIG. 9 depicts an example battery loading system according to example embodiments of the present disclosure.

FIG. 9 depicts an example method of racking a stack of batteries 700 into a rack 920 using a server lift. The battery stack 700 can be picked up from the place of delivery by the server lift and transported to the racking area. When a battery assembly 800 sitting in a battery stack 700 is ready to be loaded into a rack 920, the top battery magazine can be removed from the battery assembly 800 to install the battery assembly 800 into the corresponding storage slot 910. In example embodiments, a server lift can be used to lift a stack of batteries 700 and laterally slide one battery 810 at a time into its corresponding position in rack 920. For example, the top battery magazine of battery stack 700, containing a battery assembly 800 with a battery 810 enclosed, can be laterally moved relative to an adjacent battery magazine of the battery stack to install the battery assembly 800 into the corresponding storage slot 910 in rack 920. The height 250 of battery magazine 200 can be substantially equal to rack spacing/slot, making the load process faster and avoiding lift adjustment. According to example embodiments, a rate of about 45 batteries can be loaded in one hour.

Figure 10:
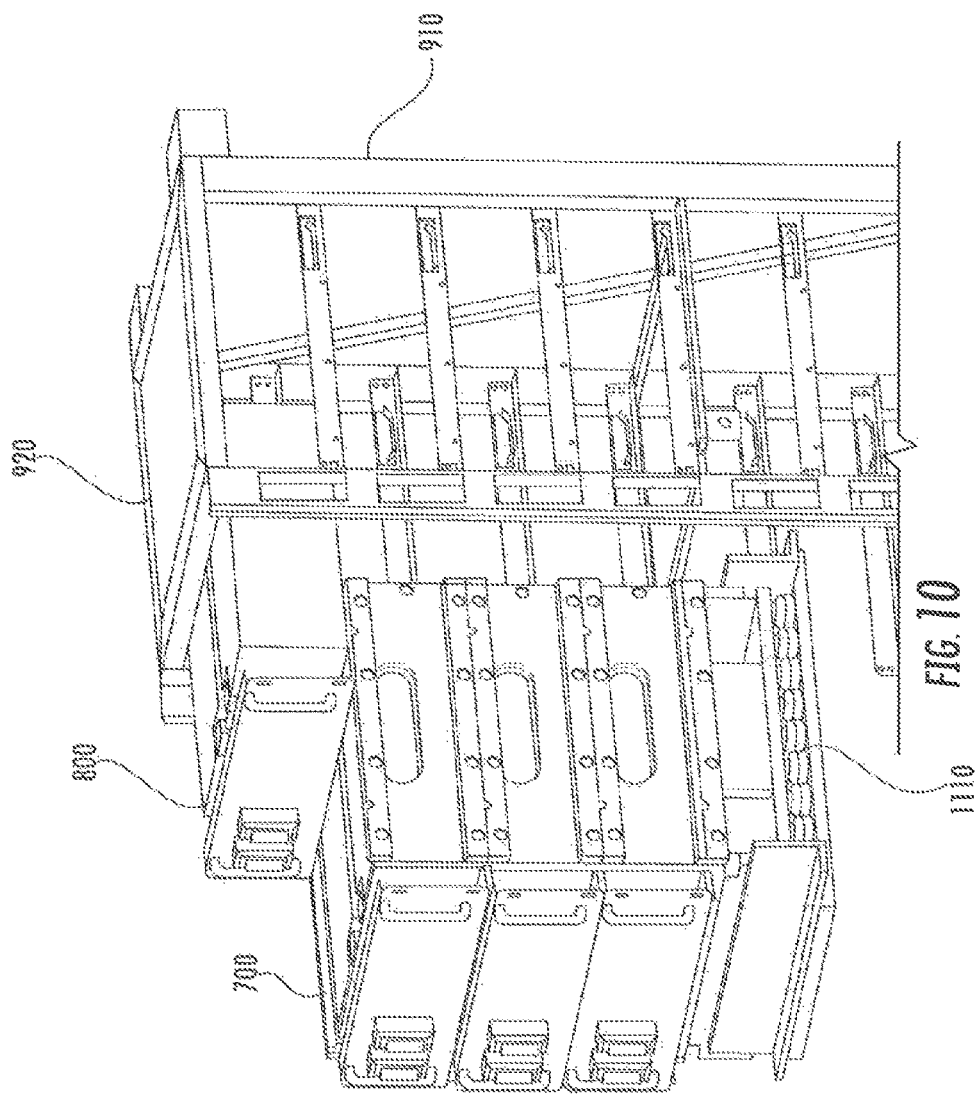
FIG. 10 depicts a perspective view of a storage system and a storage rack according to example embodiments of the present disclosure.
Figure 11:
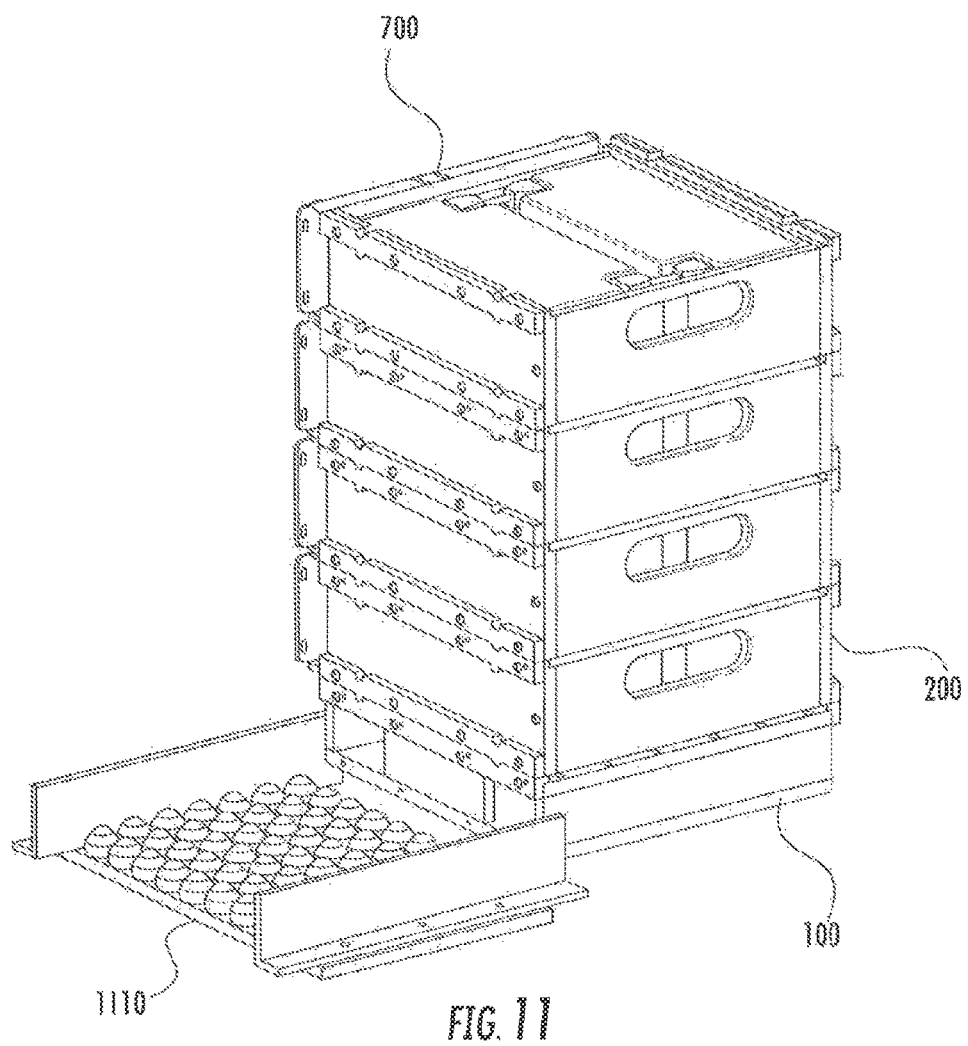
FIG. 11 depicts a perspective view of an example battery stack and rollers according example embodiments of the present disclosure.

FIG. 10 shows a close up view of the example implementation of FIG. 9 according to example embodiments of the present disclosure. Server lift rollers 1110 can be used to allow multiple battery stacks to be moved by a single person. FIG. 11 depicts a close up view of a battery stack 700 according to example embodiments of the present disclosure including base member 100, battery magazine 200 and server lift roller 1110.

Figure 12:
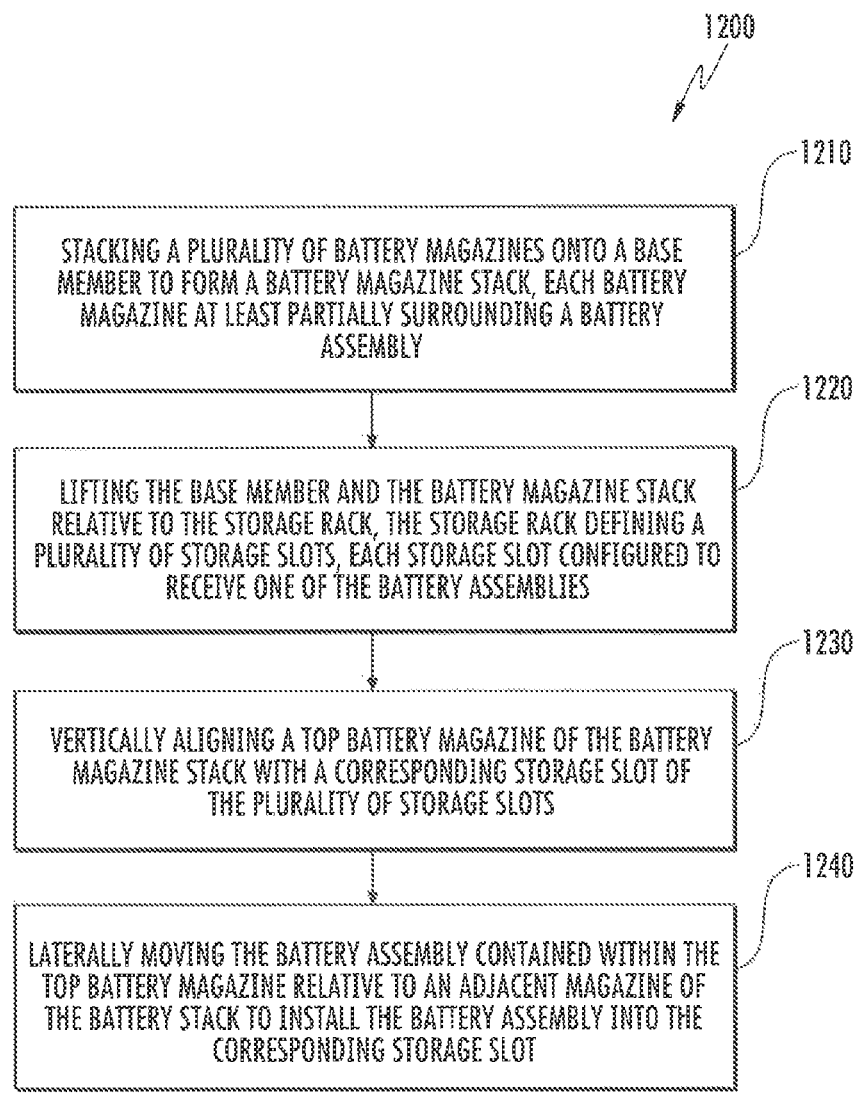
FIG. 12 depicts a flow diagram of an example method according to example embodiments of the present disclosure.

FIG. 12 shows a flow diagram of an example method 1200 of racking batteries 810 into storage racks 920. Although FIG. 12 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, performed simultaneously, combined and/or adapted in various ways.

At (1210), method 1200 can include stacking a plurality of battery magazines 200 onto a base member 100 to form a battery magazine stack 700, each battery magazine 200 at least partially surrounding a battery assembly 800. Each battery magazine 200 can be stacked on top of another. The battery magazines can be as high as 10 ft. The battery magazines can be stacked on top of each other using the respective engagement features located on each battery magazine 200. Each battery magazine 200 can include one or more engagement features located on the upper surface 270 and lower surface 220. The one or more engagement features located on the upper surface 270 can be gaps configured to engage a corresponding engagement feature 220 from the lower surface of an adjacent battery magazine. The one or more magazine engagement features 220 located on the lower surface of battery magazine 200 can be configured to engage a second engagement feature 270 located on the upper surface of an adjacent battery magazine. In example embodiments, each engagement feature can be rounded for ease of assembly during loading process. The use of the battery magazine system can protect the batteries 810 from damage because each battery is secured by the battery magazine 200. This can help prevent damage to the batteries due to dropping or jarring.

At (1220) method 1200 can include lifting the base member 100 and the battery magazine stack 700 relative to the storage rack 910, the storage rack defining a plurality of storage slots 910, each storage slot 910 configured to receive one of the battery assemblies 800. Base member 100 can include fork lift openings 140. The forklift openings 140 can be configured to allow a forklift to lift base member 100 for transporting and loading batteries into racks. Base member 100 can include feed ramp 130 and locking pin hole 150 configured to engage a fork lift or any other lifting machine. Feed ramp 130 and pin hole 150 can be located adjacent to forklift opening 140. In example embodiments, feed ramp 130 and locking pin hole 150 can be used to retain base member 100 to server lift roller guides 1110. For example, feed ramp 130 and pin hole 150 can be configured to lock automatically to a server lift; preventing movement of base member 100 and the battery stack 700 during transport.

At (1230) method 1200 can include vertically aligning a top battery magazine of the battery magazine stack with a corresponding storage slot 910 of the plurality of storage slots. The height of each battery magazine 250 can be configured to be substantially the same as the storage slot height 910. This can make the load process faster because lift adjustment of the server lift is not necessary. As show in FIG. 10, once the first battery is loaded the other batteries are already in the proper position for load.

At (1240) method 1200 can include laterally moving the battery assembly 800 contained within the top battery magazine 200 relative to an adjacent magazine of the battery stack 700 to install the battery assembly into the corresponding storage slot 910. The battery magazine 200 can be removed prior to moving the battery assembly 800 into a corresponding storage slot 910. The use of the battery magazine system can allow the batteries to be installed into taller racks holding more batteries that make for a more batteries per sq. ft. The use of the magazine system allows for a faster battery installation reducing labor costs.

Although specific features of various embodiments can be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A battery handling system, the battery handling system comprising:
    a base member including at least one support wall, the at least one support wall defining an upper surface, wherein the upper surface of the support wall defines at least one base engagement feature; and
    a battery magazine configured to engage the upper surface of the base member, the battery magazine including a first sidewall, a second sidewall, and a transverse wall extending between the first and second sidewalls, wherein the first sidewall, the second sidewall, and the transverse wall define a cavity to receive a battery assembly, wherein the battery magazine is configured to engage a portion of the battery assembly to prevent lateral movement of the battery assembly relative to the battery magazine when the battery assembly is positioned within the cavity, and wherein, when the battery magazine is installed onto the base member, the at least one base member is configured to prevent lateral movement of the battery magazine relative to the base member, each of the first and second sidewalls extending between an upper surface and a lower surface opposite the upper surface, the lower surface of at least one of the first and second sidewalls defining at least one magazine engagement feature configured to engage the at least one base engagement feature,
    wherein one of the at least one base engagement feature and the at least one magazine engagement feature comprises at least one engagement channel and the other of the at least one base engagement feature and the at least one magazine engagement feature comprises at least one rib configured to be received within the at least one engagement channel.

2. The battery handling system of claim 1, wherein the at least one base engagement feature comprises a plurality of engagement channels defined adjacent to opposed sides of the base member, wherein the at least one magazine engagement feature comprises a plurality of ribs extending outwardly from the lower surface of the at least one of the first and second sidewalls, each rib configured to be received within one of the engagement channels.

3. The battery handling system of claim 1, wherein the transverse wall extends along one side of the battery magazine, an opposed side of the battery magazine defines an open end between the first and second sidewalls to allow the battery assembly to be moved laterally relative to the battery magazine.

4. The battery handling system of claim 1, wherein the battery magazine includes a crossbar member extending between the first and second sidewalls.

5. The battery handling system of claim 4, wherein the crossbar member is configured to engage a portion of a battery assembly to prevent lateral movement of the battery assembly relative to the battery magazine in a direction opposite the transverse wall.

6. The battery handling system of claim 1, wherein the battery magazine defines at least one elongated opening through at least one of the first sidewall, the second sidewall, and the transverse wall.

7. The battery handling system of claim 1, wherein the upper surface of the battery magazine defines at least one second magazine engagement feature, the at least one second magazine engagement feature being configured to engage a corresponding engagement feature of an adjacent second battery magazine installed on top of the battery magazine.

8. The battery handling system of claim 7, wherein the adjacent second battery magazine is configured to at least partially enclose a second battery assembly, the second battery magazine being stacked on top of the battery magazine.

9. The battery handling system of claim 1, wherein the base member defines a feed ramp and a locking pin hole, wherein the feed ramp is configured to engage a locking pin and the locking pin hole is configured to receive the locking pin to lock the base member to a server lift.

10. The battery handling system of claim 1, wherein the first and second sidewalls and the transverse wall define an open bottom to allow the battery magazine to be removed from the battery assembly.

11. A method for loading battery assemblies within a storage rack, the method comprising:
stacking a plurality of battery magazines onto a base member to form a battery magazine stack, the base member including at least one support wall defining an upper surface, the upper surface of the support wall defining at least one base engagement feature, each battery magazine at least partially surrounding a battery assembly, each battery magazine including a first sidewall, a second sidewall, and a transverse wall extending between the first and second sidewalls, wherein the first sidewall, the second sidewall, and the transverse wall define a cavity to receive the battery assembly, and wherein each battery magazine is configured to engage a portion of the battery assembly to prevent lateral movement of the battery assembly relative to the battery magazine when the battery assembly is positioned within the cavity, each of the first and second sidewalls extending between an upper surface and a lower surface opposite the upper surface, the lower surface of at least one of the first and second sidewalls of each battery magazine defining at least one magazine engagement feature configured to engage the at least one base engagement feature, wherein one of the at least one base engagement feature and the at least one magazine engagement feature comprises at least one engagement channel and the other of the at least one base engagement feature and the at least one magazine engagement feature comprises at least one rib configured to be received within the at least one engagement channel;
lifting the base member and the battery magazine stack relative to the storage rack, the storage rack defining a plurality of storage slots, each storage slot configured to receive one of the battery assemblies;
vertically aligning a top battery magazine of the battery magazine stack with a corresponding storage slot of the plurality of storage slots; and
laterally moving the battery assembly contained within the top battery magazine relative to an adjacent battery magazine of the battery stack to install the battery assembly into the corresponding storage slot.

12. The method of claim 11, further comprising laterally moving the battery assembly contained within the adjacent magazine of the battery stack to install the battery assembly within an adjacent storage slot of the storage rack.

13. The method of claim 11, wherein each magazine engagement feature is configured to engage a corresponding magazine engagement feature of at least one adjacent battery magazine of the battery magazine stack.

14. The method of claim 13, wherein the magazine engagement features are configured to engage one another to prevent lateral movement of each battery magazine relative to the at least one adjacent battery magazine.

15. The method of claim 11, wherein the transverse wall extends along one side of the battery magazine between the first and second sidewalls, and wherein an opposed side of each battery magazine defines an open end of the battery magazine.

16. The method of claim 15, further comprising installing each battery assembly between the first and second sidewalls of each battery magazine by inserting the battery assembly between the first and second sidewalls at the open end of the battery magazine and sliding the battery assembly in a direction of the transverse wall.

17. The method of claim 16, further comprising installing a crossbar member between the first and second sidewalls of each battery magazine, the crossbar member configured to engage the battery assembly installed within the battery magazine to prevent lateral movement of the battery assembly in a direction opposite the transverse wall.

18. The method of claim 11, wherein each battery magazine of the battery magazine stack defines a magazine height and each storage slot of the storage rack defines a slot height, the magazine height being substantially equal to the slot height.

* * * * *